(No Model.)

E. VERSTRAETE.
PURIFYING WATER BY ALTERNATING ELECTRIC CURRENTS.

No. 586,643. Patented July 20, 1897.

Witnesses
Edw. S. Duvall Jr.
E. S. Poole

Inventor
Edmond Verstraete
By Frankland Jannus
his Attorney

UNITED STATES PATENT OFFICE.

EDMOND VERSTRAETE, OF ST. LOUIS, MISSOURI.

PURIFYING WATER BY ALTERNATING ELECTRIC CURRENTS.

SPECIFICATION forming part of Letters Patent No. 586,643, dated July 20, 1897.

Application filed June 16, 1896. Serial No. 595,750. (No model.)

*To all whom it may concern:*

Be it known that I, EDMOND VERSTRAETE, a citizen of the United States, residing at St. Louis, in the State of Missouri, have invented certain new and useful Improvements in the Purification of Water by Alternating Electric Currents, of which the following is a description, reference being had to the accompanying drawings, and to the letters and figures of reference marked thereon.

My present invention relates to the purification of water by means of alternating currents of electricity.

The object of the invention is to destroy all animal life contained in the water and also to oxidize impurities, thereby causing them to fall to the bottom, leaving the water pure and clean and enabling it to be drawn off from the impurities for use.

In the following description is set forth means for applying the current to large bodies of water, such as are contained in the settling tanks or basins which form part of the city water-supply works of some cities and to which my invention is particularly adapted.

In the purification of water by electric currents as practiced by me large masses are treated at once—as, for example, basins containing ten and twelve million gallons.

Water can be clarified in a number of ways, as by straining, filtering, and precipitating after contact with metallic salts, but this does not have the effect of killing the organic matter contained in the water, the destruction of which is the special object of the present invention. I have ascertained that I can effect this result by passing heavy alternating currents through large masses of water, as is hereinafter set forth in detail in connection with apparatus suited for the purpose.

Figure 1:
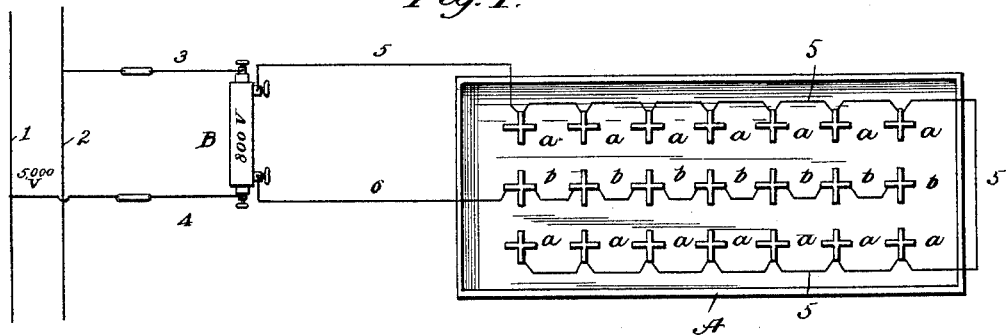
Figure 2:
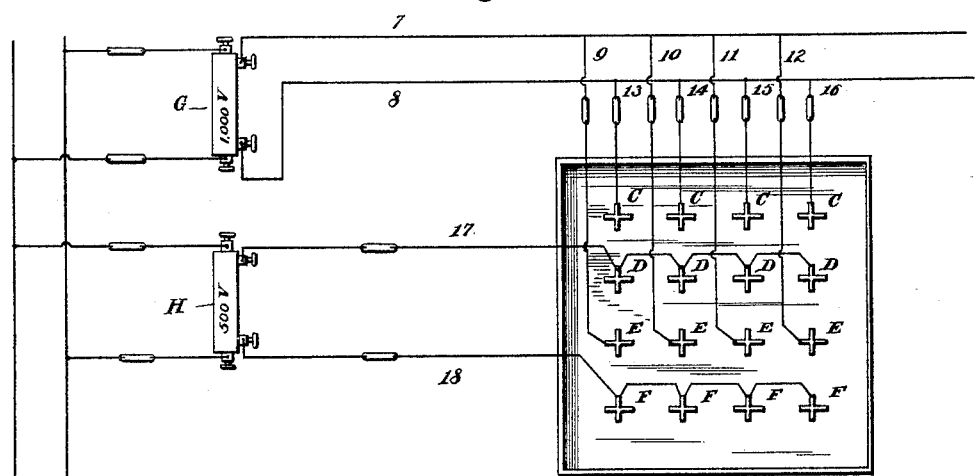
Figure 3:
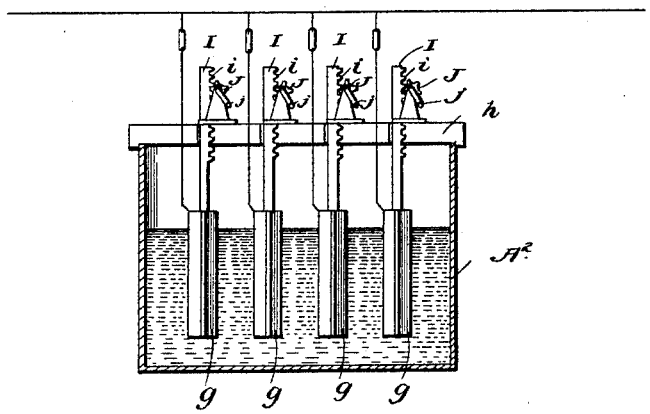

In the accompanying drawings, Figure 1 is a plan view of a water-purification plant embodying the invention. Fig. 2 is also a plan view, partly in diagram, showing different connections between the source of current and the electrodes. Fig. 3 is an elevation, partly in section, showing the tank containing the liquid to be treated, the electrodes and means for raising the same, and some of the circuit connections.

As indicated in Fig. 1, the conductors 1 2 represent the supply-circuit, which is charged with alternating currents, which for economy may be of high tension—say five thousand volts. A is a tank or basin containing the water to be treated, and as contemplated in my system the same may hold several million gallons. $a$ $a$, &c., represent electrodes on opposite sides of the tank. As shown, there are fourteen, but there may be more or fewer. Those in the particular instance are shown as connected in series with conductor 5. The number of electrodes $b$ $b$, &c., are arranged in the tank intermediate the two rows of electrodes $a$, and they are likewise connected in series with conductor 6. The conductors 5 6 are connected to opposite sides of a transformer B, which is connected with the line-conductors through wires 3 4 and serves to reduce the tension of the supply-current in the present instance to eight hundred volts.

As seen in Fig. 2, A' is the tank, which is provided with four rows of electrodes C C, &c., D D, &c., E E, &c., F F, &c. In this connection I find it desirable to provide separate supply-circuits or separate transformers, so that I may reduce the current to different tensions, as demanded by circumstances, and for convenience of description and illustration I have shown one half of the electrodes in the tank A' as connected with the transformer G in multiple arc through conductors 7 8 and connections 9 10 11 12 and 13 14 15 16. The other half of the electrodes—viz., the series D D, &c., and F F, &c.—are connected with the transformer H through conductors 17 18, with which they are in series. It will be understood in connection with this figure that I may connect all of the electrodes in either of the circuits 7 8 or 17 18 in the same manner that half of them are shown.

In Fig. 3, A² is the tank. $g$ $g$, &c., are four of the electrodes. Across the top of the tank is placed a beam or other suitable support $h$, and each of the electrodes is provided with an extension or bar I, formed or provided with a rack $i$ upon one side. The racks $i$ are engaged by pinions J, each of which is supported upon a suitable shaft provided with a hand-crank $j$ and is further provided with a retaining-pawl. By means of this apparatus the electrodes G may be raised or lowered and retained in the desired position, which is an important consideration in view of the large size of the electrodes required for use in my system. The resistance of the circuit will vary according to the immersion of the electrodes, and that I propose to vary in accordance with the effects desired. It will be understood that either one of the transformers G or H can readily be connected with the circuits 7 8 17 18, as may be desired.

Instead of treating the water while flowing into or out of the tank I treat it while stationary in the tank and after treatment allow sufficient time for the impurities to settle, after which it is drawn off for use. My system therefore involves the use of a number of tanks, which are treated in succession. After the tank is emptied the sedimentary matter which has been deposited must be removed, when the tank is again refilled, the water examined, and the same then treated as may be necessary to produce the stated effect.

Having described my invention, what I claim is—

1. The combination with a settling-basin adapted to contain a mass of liquid to be treated by alternating electric currents, of electrodes arranged substantially equidistant therein, a source of alternating currents, a plurality of tension-reducing devices, working circuits extending from the tension-reducing devices to the electrodes, and switches in said working circuits whereby the tension of the current supplied to the electrodes may be changed.

2. The combination with a settling-basin adapted to contain a mass of liquid to be treated by alternating electric currents, of electrodes arranged substantially equidistant therein, a source of alternating currents, a plurality of tension-reducing devices, working circuits extending from the tension-reducing devices to the electrodes, switches in said working circuits whereby the tension of the current supplied to the electrodes may be changed, and mechanical means for adjusting the height and immersion of the electrodes and thereby varying the resistance of the working circuit.

In testimony whereof I hereto affix my signature in presence of two witnesses.

EDMOND VERSTRAETE.

Witnesses:
GEO. P. HECKEL,
S. C. TECHUR.